Jan. 12, 1932.    H. C. PARKER    1,840,635
ELECTRICAL MEASURING INSTRUMENT
Filed Jan. 22, 1927
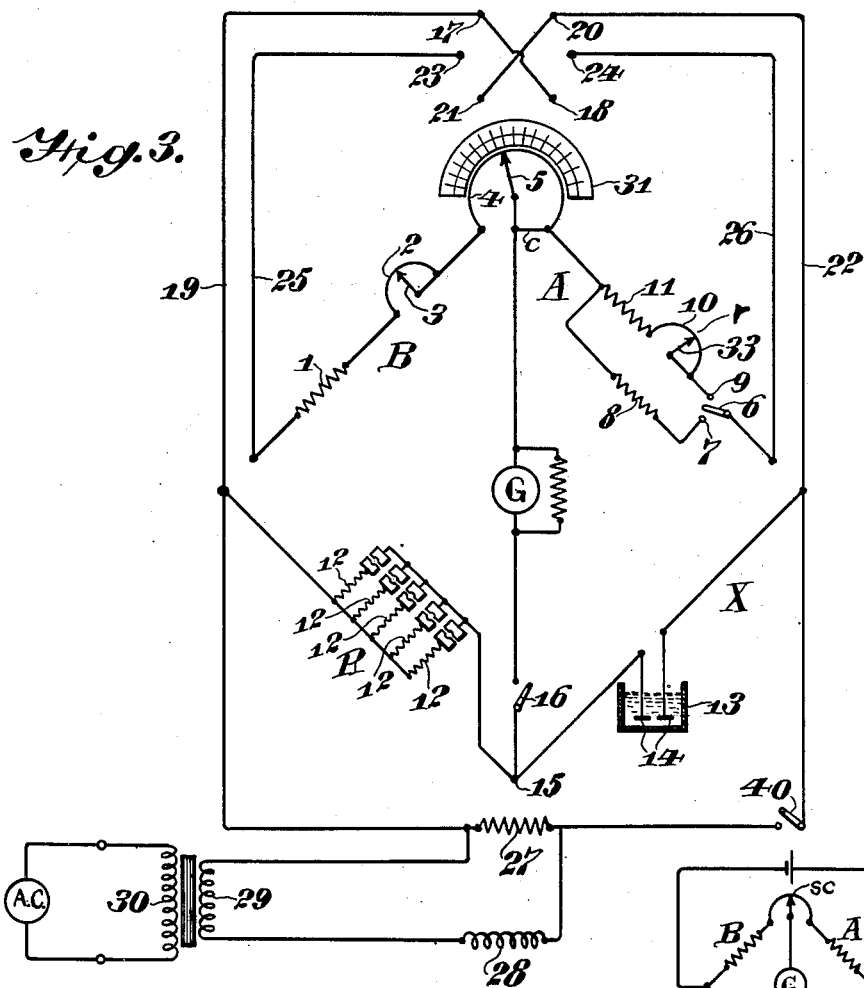
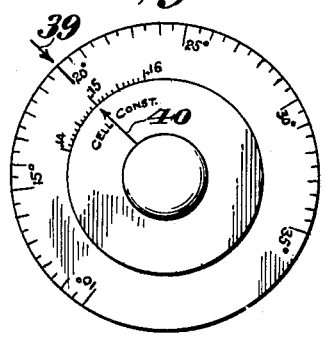
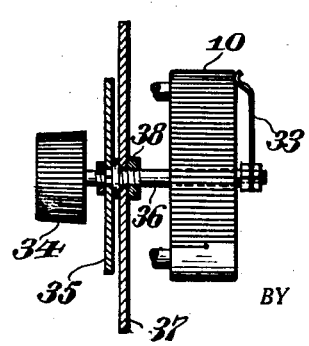
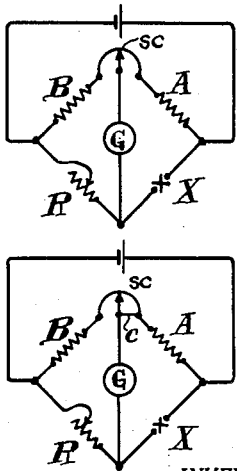
INVENTOR.
Henry C. Parker
Cornelius D. Ehret
BY
ATTORNEY.

Patented Jan. 12, 1932

1,840,635

UNITED STATES PATENT OFFICE

HENRY C. PARKER, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

ELECTRICAL MEASURING INSTRUMENT

Application filed January 22, 1927. Serial No. 162,692.

My invention relates to apparatus for making measurements of an electrical property, characteristic or a condition, such as resistance, conductivity, or the like, of bodies or masses, and particularly, the concentration of fluids, liquids, solutions and like media.

In accordance with my invention, a Wheatstone bridge for making electrical measurements is provided with a variable impedance or slide-wire, wholly within one arm of the bridge and having a movable element associated with a scale of uniformly spaced divisions and calibrated in electrical units, as of resistance, conductance, or in units directly related thereto, whereby equal increments of change of a measured condition are balanced by equal increments of change of said impedance to permit reading of the magnitude of the condition directly from said scale.

Further in accordance with my invention, certain arms of the bridge are electrically interchangeable, as by switching apparatus, and the scale of uniformly spaced divisions is calibrated both in electrical units, as ohms, and in reciprocal electrical units, as mhos, whereby, for example, the resistance and conductance of a body or mass, as of a fluid, may be read directly from the slide-wire scale.

Further in accordance with my invention, after determination of a relative property of the body, as the conductance of a solution within a conductivity cell, the impedance of an arm of the bridge is changed to a new value, such that the relation between the old and new values is expressed, other arms of the bridge remaining unchanged, by a known factor, as the constant of said conductivity cell, representative of the relation existing beween the magnitude of the relative property of the body, as conductance of said solution, and the magnitude of the specific property of the body, as the specific conductance of the solution, whereby the magnitude of the specific property may be read directly from the slide-wire scale. More specifically, there is provided a variable impedance, as a resistance, in the said arm, and associated with a calibrated temperature scale whereby specific conductance, corrected for temperature, may be read directly from the slide-wire scale.

Further in accordance with my invention, an arm of said bridge is provided with a variable impedance to permit the direct reading of the difference between the magnitudes of a property, as conductance, of different bodies or masses from the slide-wire scale.

My invention resides in features of novelty hereinafter described and claimed.

For an illustration of a form which my invention may take reference is made to the accompanying drawings, in which:

Fig. 1 is a schematic wiring diagram of the conventional Wheatstone bridge network.

Fig. 2 is a schematic wiring diagram of a modified Wheatstone bridge.

Fig. 3 is a wiring diagram of a modified Wheatstone bridge embodying my invention.

Fig. 4 is a side view in section of a variable resistance unit utilized in the modified bridge of Fig. 3.

Fig. 5 is a front elevation of the element shown in Fig. 4.

In the usual Wheatstone bridge such as is used in electrical measurements, and schematically represented in Fig. 1, X refers to an unknown resistance, R indicates a fixed or an adjustably fixed resistance, and A and B are applied to the resistance of the upper coils and of the slide-wire, between the respective coils and sliding contact SC.

The equation for this bridge is $$\frac{A}{B} \cdot R = X$$

wherein A and B are simultaneously variable as the contact SC is moved along the slide-wire. If the resistance values determined by this, the conventional type of bridge, are ploted against uniform scale divisions along the slide-wire, the ensuing graph is a rectangular hyperbole. Any attempt to calibrate the scale to read directly in terms of resistance will result therefor in an impractical crowding of the scale.

By making the connection C between resistance A and the slide-wire contact SC, as is illustrated in Fig. 2, B becomes the only variable in the equation above described so that the resistance X is an inverse linear function of the resistance B. Under such a condition it is practical and desirable to calibrate the slide-wire to read directly in terms of conductance or reciprocal ohms, as the scale will be uniformly linear. From an inspection of the formula, if B is a constant instead of A it is evident that the resistance of X becomes a linear function of A so that if the bridge arms A and B are interchanged, the slide-wire may be calibrated to read directly in terms or units of resistance or ohms on a uniformly linear scale.

A Wheatstone bridge which embodies this and other features and which is particularly adapted for determining the conductivity of solutions is disclosed in Fig. 3. The arm B of the bridge includes a fixed resistance 1, a variable resistance 2 having a contact arm 3, and such part of the slide 4 as is in series with the resistances 1 and 2 and the slide-wire contact 5. With the movable switch member 6 on the contact 7, the bridge arm A consists of resistance 8 connected to the slide-wire contact arm by the conductor C. By moving the switch member 6 in engagement with fixed contact 9, the bridge arm A includes the variable resistance 10 and the fixed resistance 11. A resistance box containing a plurality of resistances 12 each of which may be placed in circuit in the usual manner by a plug constitutes the third arm R of the bridge. The remaining arm X consists of a conductivity cell 13 which fundamentally is a flask for receiving a sample of the solution whose conductivity is to be determined and into which is dipped a pair of electrodes 14.

The galvanometer G and the galvanometer key 16 are connected in series from a point 15 intermediate of a conductor which connects one end of the resistance box 12 to one electrode 14 of the conductivity cell, to the contact arm 5 of the slide-wire 4. The other terminal of the resistance box is connected to the fixed contacts 17, 18 of a reversing switch by the conductor 19. The corresponding electrode 14 is likewise connected to fixed contacts 20, 21 of the reversing switch by the conductor 22. The movable contact arms 23, 24 of the reversing switch are connected respectively to fixed resistance 1 by wire 25 and to movable contact arm 6 by wire 26; in other words, to the non-adjacent ends of the bridge arms A and B. In the arms of the bridge conjugate to that including the galvanometer and controlled by the manually operable switch 40, is connected a resistance 27 in shunt to which are serially connected the field winding 28 of the galvanometer and the source of alternating or fluctuating current 29, which may be the secondary of a transformer, whose primary 30 is connected to a generator of such current.

When the movable contact arms 23, 24 of the reversing switch engage respectively the fixed contacts 21 and 18, the arm B is conjugate to R and arm A is conjugate to X. Therefore the readings obtained are in terms of resistance or in ohms, the unit of resistance.

When the movable contact arms 23, 24 of the reversing switch engage respectively the fixed contacts 17 and 20, the arm B is conjugate to X and arm A is conjugate to R. The readings now obtained by balancing the bridge under such circumstances are in terms of conductance, or in mhos, the unit of conductance. By virtue of the connection c, the scale divisions will be equal throughout its range. This is of particular interest because it is desirable in many industries to measure conductivities of solutions to determine their concentration. It having been established that the concentration of various dilute solutions is usually an approximate linear function of the conductance of the solution, the linear scale of the bridge may be calibrated directly in terms of concentration.

To measure the conductance of a solution a sample of it is placed in the conductivity cell 13 so that the electrodes 14 are completely immersed. With the variable resistance 2 entirely shunted out of circuit by its contact blade 3 and with the movable switch arm 6 on the fixed contact 7, the bridge is manipulated in the usual manner to obtain a balance. The slide-wire contact arm 5 will then directly indicate the conductance of the solution on the linear slide wire scale 31.

The conductance of the solution, determined in this manner, depends upon the disposition of the electrodes or, in other words, upon the cell constant. The cell constant, K, is related to the conductance L and the specific conductance $L_s$ by the equation:

$$L_s = K.L$$

The specific conductance may be determined by the insertion of the resistance 11, and the rheostat 10, into the bridge arm A, in place of the resistance 8, as follows. If the constant of the cell 14, was equal to unity, the values of the conductance as determined above would be identical to the values of the specific conductance. This means that the resistance of the bridge arm A must be identical whether the switch 6 is on the contact 7 or 9. If, on the other hand, the cell constant is 0.1, the resistance of the bridge arm A, when the switch 6 is on contact 9, must be one tenth that of the arm when the switch is on the contact point 7, etc. The bridge illustrated in Figures 3 and 5 is designed for a cell whose constant falls in the neighborhood of 0.15. Hence the resistance 11, and slide wire 10, have been so chosen that, when the sliding contact r is approximately midway of the slide wire, the resistance of the arm A is then fifteen hundredths of the resistance 8. When the contact r is placed at this point, the corresponding calibration mark is placed on the cell constant scale of Figure 5. The calibration marks 0.14 and 0.16 are scratched in on the cell constant scale, when the bridge arm A contains resistance values equal to fourteen hundredths and sixteen hundredths, respectively, of the resistance 8.

The knob 34 and compensating disk 35, shown in Figure 5, are mounted in fixed relation to the contact 33 to rotate with it. Figure 4 discloses a possible mechanical arrangement for obtaining this result. The knob 34, the disk 35 and contact arm 33 are fixedly attached to the common shaft 36. A second disk 37 having a temperature scale and a cell constant scale thereon, is loosely mounted on the shaft 36 and may be rotated independently of it. However, by tightening the clamping nut 38, this larger disk 37 rotates with the knob and dial as a unit. A stationary pointer 39 cooperates with the outer or temperature scale of the disk and the indicating arrow 40 of the disk 35 cooperates with the inner or cell constant scale.

The specific conductance of a solution varies with the temperature and, in order to obtain reproducible values without carrying out all measurements at the same temperature, it is convenient to use the same dial, shown in Figure 5, as a temperature compensating unit. If the results are to be reduced to 20° C., for example, the 20° calibration mark is placed opposite the mark 0.15 on the cell constant scale. The other marks are placed at points where the resistances of arm A of the bridge are in the same relation to the resistance at the 20° mark, as the resistances of a solution placed in cell 14 (at corresponding temperatures) are to the resistance of the solution at 20°.

The proper relation of the disks is established by loosening the lock-nut 38, introducing a solution of known specific conductance in the cell, setting the bridge to read the correct value of the specific conductance for a predetermined temperature, for example 20° C., twisting the knob 34 until the galvanometer balances, and then without again moving knob 34, rotating the disk 37 to read the cell temperature. The disks are then permanently clamped together by tightening the nut 38. The arrow 40 will then be found to point to the value of the cell constant of the cell 13.

Thereafter to determine the specific conductance, or concentration of a solution it is only necessary to move the switch member 6 into engagement with the fixed contact 9, to rotate the knob 34 until the stationary indicator 39 is opposite a point on the outer scale of disk 37 which corresponds to the cell temperature and then to manipulate the bridge to secure a balance. As was before mentioned, the slide-wire scale will be uniformly linear and may be calibrated in mhos or in terms of concentration.

In measuring the concentration of various solutions there is one correction factor which almost invariably must be applied. This is caused by the residual conductivity of the water used as a solvent and for this reason it is usually known as a "water" correction. Obviously the corrected conductance of a solution may be obtained by subtracting the conductivity of the water from the conductivity of the solution. However, if the conventional methods of measuring resistance are used, the calculation necessary to make this correction would be impractical in an industrial application of conductivity measurements.

In the usual type of Wheatstone bridge, by changing the resistance of various arms, multiplication or division may be accomplished, but not subtraction. The corrected conductance of a solution may be obtained directly from the slide-wire scale of the bridge shown in Fig. 3 in one of two ways. The first method consists of measuring the conductivity of the cell containing the solvent or water only, and subtracting the reading obtained from that resulting when the cell contains the solution.

The second method is more convenient when a series of readings are to be taken upon solutions all having the same solvent. With the cell containing the solvent only, the slide-wire arm 5 is placed at zero and the resistance 2 varied until the bridge balances. The cell is then filled with the solution and without altering the value of resistance 2 the bridge is balanced by moving the slide-wire arm 5. The reading obtained is the corrected conductance of the solution.

What I claim is:

1. The combination of a Wheatstone bridge for determining conductance, a slide-wire scale therefor calibrated in units related to conductance, a conductivity cell, and a compensating means of unitary structure adapted to compensate for cell-constant and temperature.

2. A Wheatstone bridge for directly determining the magnitude of reciprocal electrical properties comprising a variable resistance wholly in one arm thereof, a member associated with said variable resistance and movable to equal extents throughout its range of movement to effect balance of said bridge for equal increments of change of the magnitude of said electrical properties, a scale associated with said member having uniform scale divisions and calibrated directly in units of said reciprocal properties, and switching means electrically to transpose arms of said bridge whereby said bridge will read directly in terms of one of said electrical properties with the arms in one relation and in terms of the other property with the arms transposed.

3. A Wheatstone bridge for directly determining the magnitude of the resistance and conductance of a body comprising a variable impedance wholly in one arm of said bridge, a member associated with said impedance and movable to equal extents throughout a range of movement to effect balance of said bridge for equal increments of change of resistance or conductance, a scale cooperating with said member having uniform scale divisions and calibrated directly in units of resistance and conductance, and switching means electrically to transpose arms of said bridge whereby said bridge will read directly in terms of resistance with the arms in one relation and in terms of conductance with the arms transposed.

4. A Wheatstone bridge for directly determining the difference between magnitudes of an electrical property comprising a variable impedance wholly in one arm of said bridge, a scale associated therewith calibrated in units related to said property and having uniformly spaced divisions, and an impedance adjustable to effect balance of the bridge at one of said magnitudes with said variable impedance at a predetermined value, whereby the difference between said one of said magnitudes and other magnitudes may be read directly from said scale upon adjustment of said variable impedance to effect rebalancing of the bridge at said other magnitudes.

5. A Wheatstone bridge for determining the difference between conductances of different bodies comprising a variable impedance wholly in an arm of said bridge, a scale associated therewith and calibrated in units of conductance, and an impedance adjustable to effect balance of the bridge with the conductance of one of said bodies in circuit and with said variable impedance at a predetermined value, whereby the difference between the conductance of said body and of other bodies may be read directly from said scale upon adjustment of said variable impedance to effect rebalancing of the bridge with the conductance of said other bodies in circuit.

6. A Wheatstone bridge comprising a variable impedance wholly in one arm of said bridge, a scale associated therewith and calibrated in units of a relative property of a body, and an impedance in an arm of said bridge having a value proportional to a factor expressing the relation between said relative property and a specific property of said body whereby the magnitude of the specific property may be read directly from said scale.

7. A Wheatstone bridge comprising a variable impedance wholly in one arm of said bridge, a scale associated therewith and calibrated in units of conductance, and an impedance in an arm of said bridge having a value proportional to a factor expressing the relation between the conductance and the specific conductance of a body whereby the magnitude of specific conductance of the body may be read directly from said scale.

8. In a Wheatstone bridge, a variable impedance wholly in one arm of said bridge, a scale associated therewith calibrated in units related to conductance, a conductivity cell, and an impedance in an arm of said bridge having a value proportional to the constant of said cell whereby the specific conductance of a solution within said cell may be read directly from said scale.

9. In a Wheatstone bridge having a variable impedance wholly in one arm thereof and associated with a calibrated scale having uniformly spaced divisions, the method of determining the magnitude of a specific property of a body which consists of determining the magnitude of a relative property of the body by adjustment of said variable impedance to balance the bridge, of changing the value of an impedance in an arm of the bridge to a new value, the relation between which and the original value is expressed by a known factor representative of the relation between the magnitude between the relative and specific properties, and subsequently balancing the bridge by adjustment of said variable impedance whereby the magnitude of the specific property may be read directly from said scale.

10. In a Wheatstone bridge having a variable impedance wholly in one arm thereof and associated with a calibrated scale having uniformly spaced divisions, the method of determining the specific conductance of a body which consists of determining the conductance of the body by adjustment of said variable impedance to balance the bridge, of changing the value of an impedance in one arm of the bridge to a new value, the relation between which and the original value is expressed by a known factor representative of the relation between the conductance and specific conductance of the body, and subsequently balancing the bridge by adjustment of said variable impedance, whereby the specific conductance may be read directly from said scale.

11. In a Wheatstone bridge having a variable impedance wholly in one arm thereof and associated with a calibrated scale having uniformly spaced divisions, the method of determining the concentration of a solution within a conductivity cell which consists of determining the conductance of the solution by adjustment of said variable impedance to balance the bridge, of changing the value of an impedance in an arm of the bridge to a new value, the relation between which and the original value is expressed by the cell constant, and in subsequently balancing the bridge by adjustment of said variable impedance whereby the concentration of the solution may be read directly from said scale.

12. A Wheatstone bridge comprising a slide wire, a slide-wire scale calibrated in conductance units, a conductivity cell, and means for permitting direct reading from said scale of the component of conductance of an electrolyte within said cell determined by the solute comprising an impedance in said bridge subtracting from total conductivity the component due to conductivity of the solvent.

13. A Wheatstone bridge comprising a slide wire wholly in one arm of said bridge, a linear slide-wire scale, a conductivity cell, and means for permitting direct reading from said scale of the concentration of solute in electrolyte within said cell comprising an impedance in said slide-wire arm of the bridge and having a value related to the conductivity of the solvent.

HENRY C. PARKER.